(12) United States Patent
Suh et al.

(10) Patent No.: US 10,873,373 B2
(45) Date of Patent: Dec. 22, 2020

(54) SIMPLIFIED DETECTION FOR SPATIAL MODULATION AND SPACE-TIME BLOCK CODING WITH ANTENNA SELECTION

(71) Applicants: Jung Hoon Suh, Ottawa (CA); Osama Aboul-Magd, Ottawa (CA); Kwok Shum Au, Ottawa (CA)

(72) Inventors: Jung Hoon Suh, Ottawa (CA); Osama Aboul-Magd, Ottawa (CA); Kwok Shum Au, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 27 days.

(21) Appl. No.: 16/129,046

(22) Filed: Sep. 12, 2018

(65) Prior Publication Data

US 2019/0288752 A1 Sep. 19, 2019

Related U.S. Application Data

(60) Provisional application No. 62/644,279, filed on Mar. 16, 2018.

(51) Int. Cl.
*H04L 1/06* (2006.01)
*H04B 7/06* (2006.01)
*H04L 27/26* (2006.01)
*H04L 5/00* (2006.01)
*H04B 7/0452* (2017.01)
(Continued)

(52) U.S. Cl.
CPC ......... *H04B 7/0452* (2013.01); *H04B 7/0613* (2013.01); *H04L 1/0043* (2013.01); *H04L 1/0048* (2013.01); *H04L 1/0054* (2013.01); *H04L 1/0625* (2013.01); *H04L 5/0023* (2013.01); *H04L 27/2626* (2013.01); *H04B 7/066* (2013.01); *H04B 7/0854* (2013.01); *H04L 27/2675* (2013.01)

(58) Field of Classification Search
CPC .. H04B 7/0602; H04B 7/0604; H04B 7/0613; H04B 7/0697; H04B 7/0413; H04B 7/0452; H04L 27/2626; H04L 27/2627; H04L 1/0625; H04L 5/0007; H04L 5/0023; H04L 1/0041; H04L 1/0071
See application file for complete search history.

(56) References Cited

U.S. PATENT DOCUMENTS 8,094,743 B2 * 1/2012 Ahn ...................... H04B 7/0691
375/267
9,819,527 B2 * 11/2017 Mohamed ............ H04B 7/0697
9,935,737 B2 * 4/2018 Mohamed ............. H04L 5/0023

FOREIGN PATENT DOCUMENTS

WO 0237742 A2 5/2002
WO 2005025117 A2 3/2005
WO 2006069270 A1 6/2006

OTHER PUBLICATIONS

A. Helmy, et. al., "Spatial Modulation for Improved Performance of Next-Generation WLAN", WCNC 2017, San Francisco, CA, U.S.A.

* cited by examiner

*Primary Examiner* — Betsy Deppe

(57) ABSTRACT

Methods and systems that can enable antenna selection (AS) and data bits in transmitted spatially modulated (SM) streams to be detected at a receiver using different detection methods. In example embodiments, encoding for an AS stream is done separately at a transmitter than encoding for data streams, enabling a receiver to use one type of detection for AS bits and a reduced complexity type of MIMO detection for the data bits.

12 Claims, 6 Drawing Sheets

(51) Int. Cl.
*H04L 1/00* (2006.01)
*H04B 7/08* (2006.01)

SIMPLIFIED DETECTION FOR SPATIAL MODULATION AND SPACE-TIME BLOCK CODING WITH ANTENNA SELECTION

CROSS-REFERENCE TO RELATED APPLICATIONS

The present disclosure claims priority from U.S. provisional patent application No. 62/644,279 filed Mar. 16, 2018, entitled "SIMPLIFIED DETECTION FOR SPATIAL MODULATION AND SPACE-TIME BLOCK CODING WITH ANTENNA SELECTION", the entirety of which is hereby incorporated by reference

FIELD

The present disclosure is related to methods and systems for transmitting and receiving communications signals using spatial modulation and space-time block coding.

BACKGROUND

The proliferation of connected devices is driving a need for wireless networks that can support ever increasing numbers of devices concentrated within a geographical area. Many heterogeneous devices need to be supported in a dense deployment scenario, including for example higher power devices such as personal computers and lower power devices such as Internet of Things (IoT) devices and wearable devices.

Multiple Input Multiple Output (MIMO) systems that use multiple antennas can increase network capacity. Spatial modulation (SM) is a type of MIMO in which only a subset of available transmit (TX) antennas of a network transmitter are activated at any time instance. SM can be useful in low-complexity MIMO implementations, including for example for transmitting messages to IoT and wearable devices, and can operate in an open-loop fashion without requiring channel state information at the transmitter.

In at least some SM schemes, as shown for example in A. Helmy, et. al., "Spatial Modulation for Improved Performance of Next-Generation WLAN", WCNC 2017, San Francisco, Calif. USA, antenna selection is carried out in accordance with antenna selection (AS) bits that are included in a separate antenna selection stream. The AS bits are not pre-defined or known at a receiver. Hence, the receiver relies on a Maximum Likelihood (ML) type of detection to determine the AS bits. A. Helmy, et. al. describes a transmitter that applies Forward Error Correction (FEC) encoding for both the data streams and the AS stream together, with the result that a receiver must also apply the same ML detection to recover the bits of the data streams. The complexity of ML detection is very high, especially for Modulation and Coding Schemes (MCS) of 16-QAM or above.

Accordingly, there is a need for an SM system that permits AS and data bits received at a receiver to be recovered using different detection methods.

SUMMARY

Methods and systems are described in this disclosure that can enable AS and data bits in transmitted SM streams to be detected at a receiver using different detection methods. In example embodiments, encoding for an AS stream is done separately at a transmitter than encoding for data streams, enabling a receiver to use one type of detection (for example ML detection) for AS bits and a reduced complexity type of MIMO detection for the data bits (for example Minimum Mean Square Error (MMSE) detection or Zero Forcing (ZF) detection).

In some aspects, the present disclosure describes a method performed at a transmitter, comprising: dividing a data bitstream into first data bitstream and an antenna selection (AS) bitstream; forward error correction (FEC) encoding the first data bitstream; FEC encoding the AS bitstream independently from the first data bitstream; dividing the first data bitstream into a plurality of streams and mapping bits in each of the streams to constellation points; and encoding the constellation points from each stream as orthogonal frequency division multiplexing (OFDM) symbols and mapping the ODFM symbols from each steam to a respective transmit antenna set for transmission as a spatially modulated (SM) stream, wherein the mapping to the respective transmit antenna set for each stream is determined by AS bits from the AS bitstream and the AS bits are inherent in the OFDM symbols.

In some aspects, the present disclosure describes a method performed at a transmitter, comprising: dividing a data bitstream into first data bitstream and an antenna selection (AS) bitstream; dividing the first data bitstream into a plurality of space time streams that are each respectively encoded as orthogonal frequency division multiplexing (OFDM) symbols and mapped to a respective transmit antenna set for transmission as an radio frequency spatially modulated (SM) stream, each space time stream being mapped to the respective transmit antenna set based on the AS bits from the AS bitstream, the AS bits being encoded on each subcarrier of the OFDM symbols. The first data bitstream and the AS bitstream are independently FEC encoded at the transmitter.

In some aspects, the present disclosure describes a method for processing a plurality of spatially modulated streams each received through a plurality of antennas at a receiver, comprising: applying Maximum Likelihood (ML) Log Likelihood Ratio (LLR) based detection to the spatially modulated streams to detect antenna selection bits; and applying multiple input multiple output (MIMO) detection to separate the SM modulated streams into spatial streams for constellation demapping, wherein the MIMO detection is based on the detected antenna selection bits and uses a detection other than (ML) Log Likelihood Ratio (LLR) based detection.

In some aspects, the present disclosure describes a method of transmitting data wherein antenna selection is applied to pilot subcarriers in an OFDM symbol, enabling an LLR calculation for the Antenna Selection bits at a receiver to be done through a Euclidean distance computation between the received signal and a BPSK or QBPSK constellation, regardless of the MCS for information bits included in the OFDM symbol.

In some aspects, the present disclosure describes a method of generating a PPDU for a transmitter in which a subset of available transmit chains are used to transmit spatially modulated streams, comprising including channel estimation information for all of the transmit chains in the PPDU.

In some aspects, the present disclosure describes a method performed at a transmitter. The method includes applying forward error correction (FEC) encoding to encode a first portion of an incoming data bitstream into a first encoded bitstream; applying FEC encoding to encode, independently of the first portion, a second portion of the incoming data bitstream into an antenna selection (AS)

bitstream; encoding each of a plurality of spatial stream into respective symbols, each spatial stream being a different respective portion of the first encoded bistream; and transmitting the symbols over respective transmit antenna sets, the respective transmit antenna set for transmitting each symbol being determined by AS bits from the AS bitstream.

In any of the preceding aspects/embodiments, encoding each of the plurality of spatial streams into respective symbols may include: encoding bits in each of the spatial streams; mapping bits in each of the spatial streams to constellation points; and mapping the constellation points from each spatial stream into the respective symbols.

In any of the preceding aspects/embodiments, the symbols may be orthogonal frequency division multiplexing (OFDM) symbols.

In any of the preceding aspects/embodiments, the AS bits may be inherent, sub-carrier by sub-carrier in the OFDM symbols.

In any of the preceding aspects/embodiments, the method may be for generating and transmitting a data Physical Layer Convergence Procedure (PLCP) Protocol Data Unit (PPDU). The method may also include: including, in a preamble of the PPDU, a plurality of long training fields (LTFs), wherein the number of LTFs in the preamble corresponds to a total number $N_T$ of transmit antennas; wherein the total number $N_T$ of transmit antennas is greater than a number N of transmit streams used for transmitting the data PPDU.

In any of the preceding aspects/embodiments, pilot sub-carriers of the symbols may be mapped to respective transmit antenna sets, in accordance with the AS bits.

In some aspects, the present disclosure describes a processing system comprising memory and a processing device coupled to the memory. The processing device is configured to: apply forward error correction (FEC) encoding to encode a first portion of an incoming data bitstream into a first encoded bitstream; apply FEC encoding to encode, independently of the first portion, a second portion of the incoming data bitstream into an antenna selection (AS) bitstream; encode each of a plurality of spatial streams into respective symbols, each spatial stream being a different respective portion of the first encoded bitstream; and transmit the symbols over respective transmit antenna sets, the respective transmit antenna set for transmitting each symbol being determined by AS bits from the AS bitstream.

In any of the preceding aspects/embodiments, the processing device may be configured to encode each of the plurality of spatial streams into respective symbols by: encoding bits in each of the spatial streams; mapping bits in each of the spatial streams to constellation points; and mapping the constellation points from each spatial stream into the respective symbols.

In any of the preceding aspects/embodiments, the symbols may be orthogonal frequency division multiplexing (OFDM) symbols.

In any of the preceding aspects/embodiments, the AS bits may be inherent, sub-carrier by sub-carrier in the OFDM symbols.

In any of the preceding aspects/embodiments, the processing device may be configured to generate a data Physical Layer Convergence Procedure (PLCP) Protocol Data Unit (PPDU) using the encoding, and to transmit the PPDU over the respective transmit antenna sets using the transmitting. The processing device may be further configured to: include, in a preamble of the PPDU, a plurality of long training fields (LTFs), wherein the number of LTFs in the preamble corresponds to a total number $N_T$ of transmit antennas; wherein the total number $N_T$ of transmit antennas is greater than a number N of transmit streams used for transmitting the data PPDU.

In any of the preceding aspects/embodiments, pilot sub-carriers of the symbols may be mapped to respective transmit antenna sets, in accordance with the AS bits.

In some aspects, the present disclosure provides a method for processing a plurality of spatially modulated streams each received through a plurality of antennas at a receiver. The method includes: applying Maximum Likelihood (ML) Log Likelihood Ratio (LLR) based detection to the spatially modulated streams to detect antenna selection (AS) bits; applying multiple input multiple output (MIMO) detection to separate the SM modulated streams into respective streams for decoding, wherein the MIMO detection is based on the detected AS bits and uses a detection other than ML based detection; and decoding the respective streams.

In any of the preceding aspects/embodiments, the MIMO detection may be performed using Minimum Mean Square Error (MMSE) detection or Zero Forcing (ZF) detection.

In any of the preceding aspects/embodiments, the MIMO detection may be performed using Minimum Min Square Error (MMSE) detection or Zero Forcing (ZF) detection.

In any of the preceding aspects/embodiments, the ML LLR detection of the AS bits may be performed using Euclidean distance computation between the received spatially modulated streams and a binary phase shift keying (BPSK) constellation.

In some aspects, the present disclosure describes a processing system comprising memory and a processing device coupled to the memory. The processing device is configured to: apply Maximum Likelihood (ML) Log Likelihood Ratio (LLR) based detection to a plurality of spatially modulated streams received at a plurality of receiver antennas to detect antenna selection (AS) bits; apply multiple input multiple output (MIMO) detection to separate the SM modulated streams into respective streams for decoding, wherein the MIMO detection MIMO detection is based on the detected AS bits and uses a detection other than ML based detection; and decode the respective streams.

In any of the preceding aspects/embodiments, the processing device may be further configured to perform the decoding by: performing constellation demapping; and performing bit deinterleaving.

In any of the preceding aspects/embodiments, the MIMO detection may be performed using Minimum Mean Square Error (MMSE) detection or Zero Forcing (ZF) detection.

In any of the preceding aspects/embodiments, the ML LLR detection of the AS bits may be performed using Euclidean distance computation between the received spatially modulated streams and a binary phase shift keying (BPSK) constellation.

In some aspects, the present disclosure describes a processing system comprising memory and a processing device coupled to the memory. The processing device is configured to perform any of the preceding methods.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The following is a table of selected acronyms used in the following description:

TABLE 1

Acronyms

| Acronym | Definition |
|---------|------------|
| STA | Station |
| AP | Access Point |
| SM | Spatial Modulation |
| AS | Antenna Selection |
| ML | Maximum Likelihood |
| FEC | Forward Error Correction |
| MCS | Modulation and Coding Scheme |
| MIMO | Multiple Input Multiple Output |
| MMSE | Minimum Mean Square Error |
| ZF | Zero Forcing |
| STBC | Space-Time Block Coding |
| TX | Transmitter |
| RX | Receiver |
| LLR | Log Likelihood Ratio |
| QAM | Quadrature Amplitude Modulation |
| ChanD | Channel D; One of the IEEE Channel Models |
| BCC | Binary Convolutional Coding |
| LDPC | Low-Density Parity Check |

Figure 1:
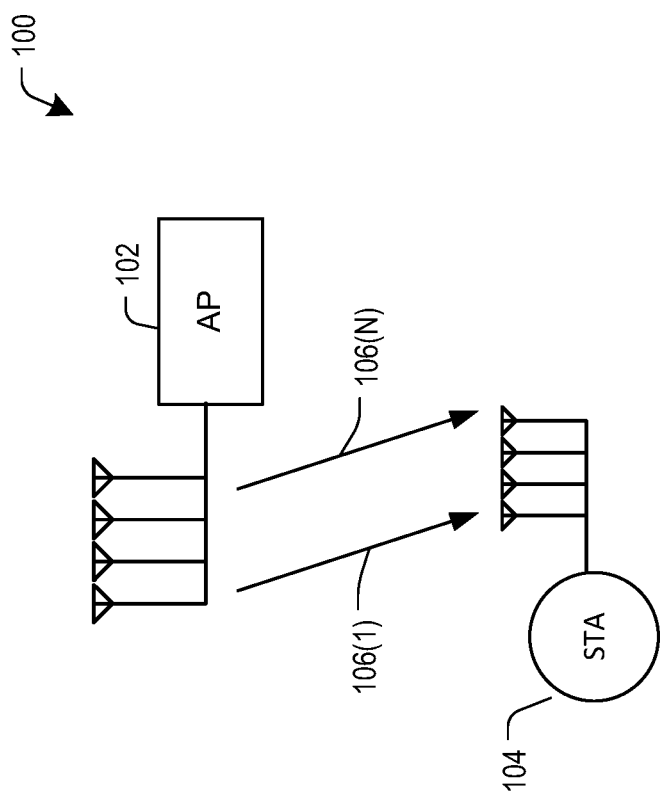
FIG. 1 is a schematic diagram illustrating an example of an RF communication network in which example embodiments can be implemented.

FIG. 1 is a schematic diagram of an example system 100 in which methods described herein may be implemented. The system 100 illustrates a local wireless area network infrastructure, which may for example be a Wi-Fi infrastructure, including an access point (AP) 102. The AP 102 may be also referred to as a Personal Basic Service Set (PBSS) control point (PCP) or a base station. The AP 102 may be implemented as a router, for example. Generally, the AP 102 may refer to any component (or collection of components) configured to provide wireless access in a network, such as an evolved NodeB (eNB), a macro-cell, a femtocell, distribution node, a Wi-Fi AP, or other wirelessly enabled devices. The AP 102 may, for example, provide wireless access in accordance with one or more wireless communication protocols, e.g., Long Term Evolution (LTE), LTE advanced (LTE-A), High Speed Packet Access (HSPA), Wi-Fi 802.11a/b/g/n/ac/ad, and other 802.11 protocols. At least one station (STA) 104 is associated with the AP 102. In configurations where multiple STAs are associated with the AP 102, each STA 104 may operate independently of each other, with different capabilities. A STA 104 may also be referred to as a terminal, user device, user equipment (UE) or client, for example. Each STA 104 may be any component (or collection of components) capable of wireless communications, such as any suitable electronic device (ED) capable of wireless communication, including mobile or stationary devices such as smartphones, laptops, mobile phones, Internet of Things (IoT) devices, wearable devices, tablet devices or any other wirelessly enabled devices, and the STAs 104 need not be the same as each other.

The system 100 may support communication between the AP 102 and each STA 104, as well as communication directly between STAs 104 (also referred to as device-to-device communication). A STA 104 may also serve as a relay for AP-to-STA or STA-to-STA communications. The AP 102 may also carry out multi-user (MU) transmissions (e.g., transmissions from the AP 102 to multiple STAs 104 simultaneously), for example by using directional antennas and/or by using frequency separation. In the example of FIG. 1, the system 100 supports MIMO communications between AP 102 and STA 104, permitting multiple spatially modulated (SM) streams 106(1) to 106(N) (each generically referred to as an SM stream 106) of RF signals to be sent from AP 102 to STA 104 at the same time.

Figure 2:
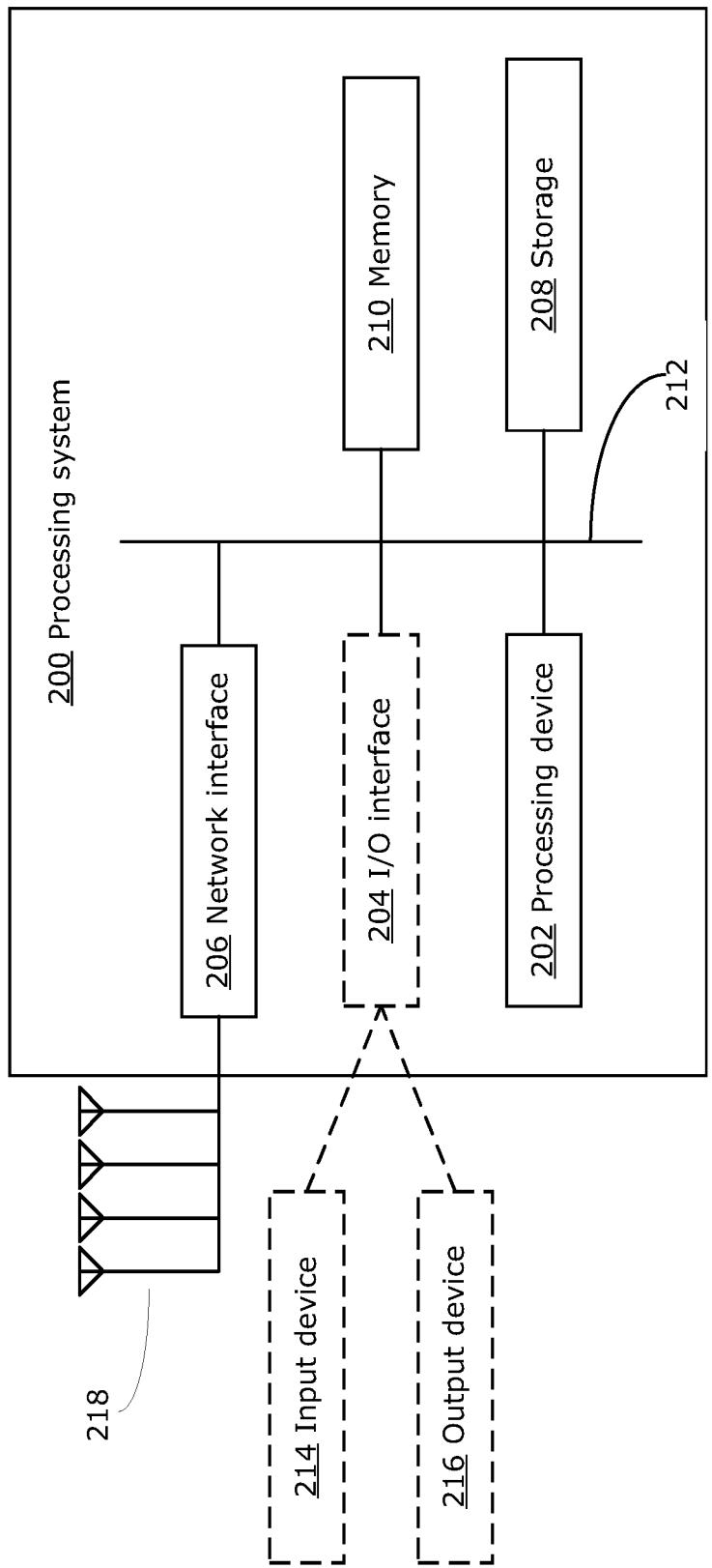
FIG. 2 is a block diagram illustrating an example device suitable for transmitting or receiving RF communications.

FIG. 2 is a block diagram of an example simplified processing system 200, which may be used to implement embodiments disclosed herein. The example processing system 200 described below, or variations thereof, may be used to implement the AP 102 or any one of the STAs 104. Other processing systems may be suitable for implementing embodiments described in the present disclosure, and may include components different from those discussed below. Although FIG. 2 shows a single instance of each component, there may be multiple instances of each component in the processing system 200.

The processing system 200 may include one or more processing devices 202, such as a processor, a microprocessor, an application-specific integrated circuit (ASIC), a field-programmable gate array (FPGA), a dedicated logic circuitry, or combinations thereof. The processing system 200 may optionally include one or more input/output (I/O) interfaces 204, to enable interfacing with one or more optional input devices 214 and/or output devices 216. The processing system 200 may include one or more network interfaces 206 for wired or wireless communication with a network (e.g., an intranet, the Internet, a P2P network, a WAN and/or a LAN) or other node. The network interface(s) 206 may include wired links (e.g., Ethernet cable) and/or wireless links (e.g., one or more antennas) for intra-network and/or inter-network communications.

The network interface(s) 206 may provide wireless communication via one or more antennas. In this example, multiple antennas together form an antenna array 218, which may perform both transmitting and receiving functions. The antenna array 218 may enable directional communications using beamforming and beamtracking. In other examples there may be separate antennas or separate antenna arrays for transmitting and receiving.

The processing system 200 may also include one or more storage units 208, which may include a mass storage unit such as a solid state drive, a hard disk drive, a magnetic disk drive and/or an optical disk drive. The processing system 200 may include one or more memories 210, which may include a volatile or non-volatile memory (e.g., a flash memory, a random access memory (RAM), and/or a read-only memory (ROM)). The non-transitory memory(ies) 210 may store instructions for execution by the processing device(s) 202, such as to carry out example methods described in the present disclosure. The memory(ies) 210 may include other software instructions, such as for implementing an operating system and other applications/functions. In some examples, one or more data sets and/or modules may be provided by an external memory (e.g., an external drive in wired or wireless communication with the processing system 200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 212 providing communication among components of the processing system 200, including the processing device(s) 202, optional I/O interface(s) 204, network interface(s) 206, storage unit(s) 208 and/or memory(ies) 210. The bus 212 may be any suitable bus architecture including, for example, a memory bus, a peripheral bus or a video bus.

In FIG. 2, the optional input device(s) 214 (e.g., a keyboard, a mouse, a microphone, a touchscreen, and/or a keypad) and optional output device(s) 216 (e.g., a display, a speaker and/or a printer) are shown as external to the processing system 200. In other examples, one or more of the input device(s) 214 and/or the output device(s) 216 may an internal component of the processing system 200.

Figure 3:
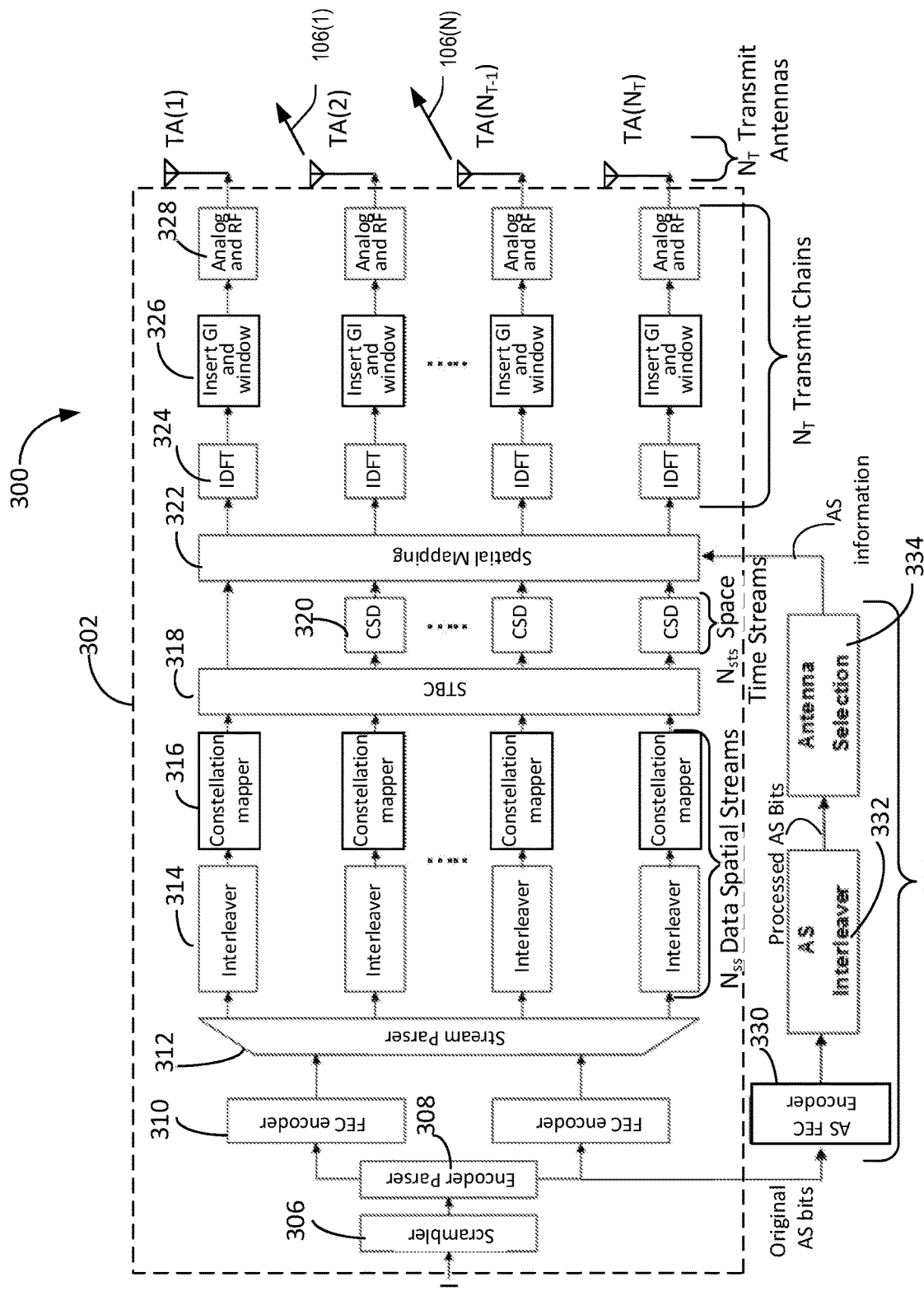
FIG. 3 is a block diagram illustrating a transmitter according to a first example embodiment.

FIG. 3 is a block diagram illustrating a transmitter 300 implemented by the processing system 200 of an AP 102 according to example embodiments. The transmitter 300 includes a first group 302 of transmitter blocks that correspond to the transmitter blocks specified in IEEE Std 802.11-2016, Clause 19: High-Throughput (HT) PHY specification. In the embodiment of FIG. 3, in addition to the first group 302 of transmitter blocks, the transmitter 300 also includes an antenna selection (AS) group 304 of transmitter blocks, which as described below, enables AS bits to be encoded separately from data bits that are encoded by the first group 302 of transmitter blocks.

In the illustrated embodiment, the first group 302 of transmitter blocks includes operational processes represented by the following blocks: a) Scrambler (block 306): scrambles input data (incoming interleaved bitstream I) to reduce the probability of long sequences of 0s or 1s; b) Encoder parser (block 308): if Binary Convolutional Coding (BCC) encoding is to be used, demultiplexes the scrambled bits among $N_{ES}$ (number of BCC encoders for the Data field). BCC encoders, in a round robin manner, also as described below, separate data bits to use as antenna selection (AS) bits from the scrambled bits; c) FEC encoders (block 310): encode the data to enable error correction (An FEC encoder may include a BCC encoder followed by a puncturing device, or it may include a Low-Density Parity Check (LDPC) encoder); d) Stream parser (block 312) divides the outputs of the FEC encoders 310 into spatial streams that are sent to different interleavers and mappers; e) Interleaver (block 314): interleaves the bits of each spatial stream (changes order of bits) to prevent long sequences of adjacent noisy bits (Interleaving may be applied only when BCC encoding is used); f) Constellation mapper (block 316): maps the sequence of bits in each spatial stream to constellation points (complex numbers); g) Space-Time Block Coding (STBC) encoder (block 318): spreads constellation points from $N_{ss}$ spatial streams into $N_{sts}$ space-time streams using a space-time block code (STBC may be used only when $N_{ss}<N_{sts}$); h) Cyclic shift diversity (CSD) (block 320): insertion of a cyclic shift per space-time stream to prevent unintentional beamforming; i) Spatial mapper (block 322): maps space-time streams to transmit chains; j) Inverse discrete Fourier transform (IDFT) (block 324): converts a block of constellation points to a time domain block; k) Guard interval (GI) insertion and Window (block 326): GI insertion prepends a GI to the symbol with a circular extension of itself, windowing optionally smoothes the edges of each symbol to increase spectral decay; i) Analog and RF (block 328): up-converts subcarriers to carrier frequency and transmits the resulting up-converted stream into a wireless channel through a respective transmit antenna TA(1) to TA($N_T$) (referred to generically as transmit antenna TA or transmit antennas TA(i)).

The first group 302 of transmitter blocks is configured to generate the Data field of Physical Layer Convergence Procedure (PLCP) Protocol Data Units (PPDUs). A subset of the group 302 of transmitter blocks, including the constellation mapper (block 316), CSD (block 320), spatial mapping (block 312) and the transmit chains, are also used to generate preamble fields of PPDUs, including High Throughput Long Training Fields (HT-LTFs).

In example embodiments, some of the transmitter processing blocks in first group 302 may be omitted depending on the specific application. For example, in some transmitter configurations where BCC encoding is not used the multiple data stream FEC encoders 310 could be replaced with a single FEC encoder 310. In some examples STBC 318 block may be omitted.

The present disclosure is directed to applications where the transmitter 300 is configured to generate a number (N) of space time streams that is less than the number $N_T$ of transmit antennas TA(i) available at the transmitter 300, and to use a subset of N of the $N_T$ transmit antennas TA(i) to transmit N SM streams 106(1) to 106(N). In the example embodiment that will now be described, the number N of space time streams generated at a given time by transmitter 300 is equal to the number of data spatial streams as well as the number of transmitted SM streams 106(1) to 106(N), and the STBC 318 block of transmitter 300 can be omitted. Because the number (N) of transmit chains and corresponding transmit antennas TA(i) used to transmit SM streams 106 is less that the total number ($N_T$) of transmit chains and antennas, spatial mapping block 322 requires instructions as to what antennas to select. The antenna selection by mapping block 322 is done on an OFDM sub-carrier by OFDM sub-carrier basis.

In an example embodiment, when generating the data field of a PPDU, the transmitter 300 receives as input a bitstream I that includes a stream of data bits. Selected bits from the data stream are used by the transmitter 300 as antenna selection (AS) bits. These AS bits are used to specify which of the $N_T$ transmit antennas TA(i) (and corresponding transmit chains) are to be used to transmit the respective SM streams 106. Because the AS bits are selected from the data bits of input bitstream I and are not solely for the purpose of antenna selection, the bits that are used for antenna selection have a dual purpose of transmitting data as well as providing antenna selection information.

Accordingly, in example embodiments, the encoder parser 308 is configured to divide the incoming data bitstream I into one or more data spatial streams and a separate AS stream 305. The one or more data spatial streams collectively include mN bits/OFDM symbol/subcarrier, with N being the number of spatial streams and m=log 2(M), where M is the signal constellation alphabet size that is applied at constellation mappers (block 316). The AS stream 305 includes n bits/OFDM symbol/subcarrier where n is the number of active antenna section bits used to represent an index value that identifies which of the $N_T$ antennas are selected. The bits of the AS stream 305 are sent to the AS group 304 of transmitter blocks for separate processing, and the data streams are sent to the FEC encoder(s) (block 310) and stream parser (block 312) in the first group 302 of transmitter blocks to generate N data spatial streams that are each subjected to respective interleaver (block 314) and constellation mapper (block 316) operations, resulting in N corresponding data space time stream inputs to spatial mapping operation (block 322).

Referring again to AS stream 305, the parsing process applied by encoder parser (block 308) to selectively divide the n bits/OFDM symbol/subcarrier for the AS stream 305 from the incoming data bitstream I can be any suitable predefined parsing process. In FIG. 3, the AS bits that are output by encoder parser 308 are identified as original AS bits. The AS group 304 of transmitter blocks processes the AS stream 305 to convert the original AS bits into processed AS Bits and AS selection information that are then used for antenna selection and subcarrier encoding by spatial mapper (block 322). In particular, a separate FEC encoding operation is applied by an AS stream specific AS FEC encoder (block 330) to the original AS bits of the AS stream 305. Thus, the AS bitstream is FEC encoded at AS FEC encoder (block 330) independently of the data bitstream(s) that are FEC encoded at the encoders (blocks 310) of the first group 302 of transmitter blocks.

The FEC encoded AS bits are then interleaved at AS interleaver (block 332), resulting in processed AS bits. An antenna selection operation (block 334) is then applied to the encoded, interleaved AS bits (the encoded, interleaved bits being the processed AS bits) to determine, based on the AS bits included in the AS stream 305, which of the antennas TA(1) to TA($N_T$) to use. Antenna selection operation (block 334) may for example be based on a look-up-table. An example embodiment of an antenna selection look up table for an example where the number of SM streams is N=2, the number of available transmit antennas is $N_T$=4, and the number of active AS bits is n=2, is as follows.

TABLE 2

Antenna Selection Table

| Index for the selected Antenna combination | Two data bits corresponding to each selected Antenna combination (1$^{st}$ bit, 2$^{nd}$ bit) | Selected TX antenna set (1st TA, 2nd TA) |
| --- | --- | --- |
| 0 | (0, 0) | [TA 0, TA 1] |
| 1 | (0, 1) | [TA 2, TA 3] |
| 2 | (1, 0) | [TA 0, TA 3] |
| 3 | (1, 1) | [TA 1, TA 2] |

In example embodiments, the information identifying the selected antenna set (e.g. column 3 of table 1) is provided to the spatial mapping process (block 332) which maps the constellation points from the N data space time streams directly onto the respective transmit chains of the selected transmit antennas TA(i). In the above example in which the number of AS bits is two, two processed AS bits are used to select two TX antennas per sub-carrier. The resulting SM streams 106(1) to 106(N) are then transmitted. In at least some example embodiments, pilot subcarriers that cannot otherwise be used for data transmission may be used to carry data inherent through the AS bits, because the TX antenna selection for pilot sub-carriers shall be done by the AS bits, as well.

As noted above, a subset of the blocks of transmitter 300 is used to generate the preamble portion of a PPDU, including the HT-LTFs, that precedes the data field. In multiple-transmit antenna situations, the number of HT-LTFs included in the PPDU prior to the data field is typically determined by the number of active transmit streams. However, in the present embodiments, the receiving device (for example STA 104) is not previously aware of which of the transmitter antennas TA(1) to TA($N_T$) will actually be used to transmit the SM streams 106, and accordingly requires information to estimate all of the $N_T$ possible SM stream channels. Accordingly, when the transmitter 300 assembles a PPDU, it must include a sufficient number of HT-LTFs to allow the receiving device to estimate all $N_T$ possible SM stream channels. By way of example, where $N_T$=4, then 4 HT-LTFs must be included in the PPDU preamble. Although this may, in some applications, increase the amount of overhead required for channel estimation when compared to other spatial multiplexing based MIMO systems, as noted above in example embodiments the AS bits that are transmitted in SM streams 106 carry both data and antenna selection information, thereby increasing throughput by an extra n bits per subcarrier per OFDM symbol.

Figure 4:
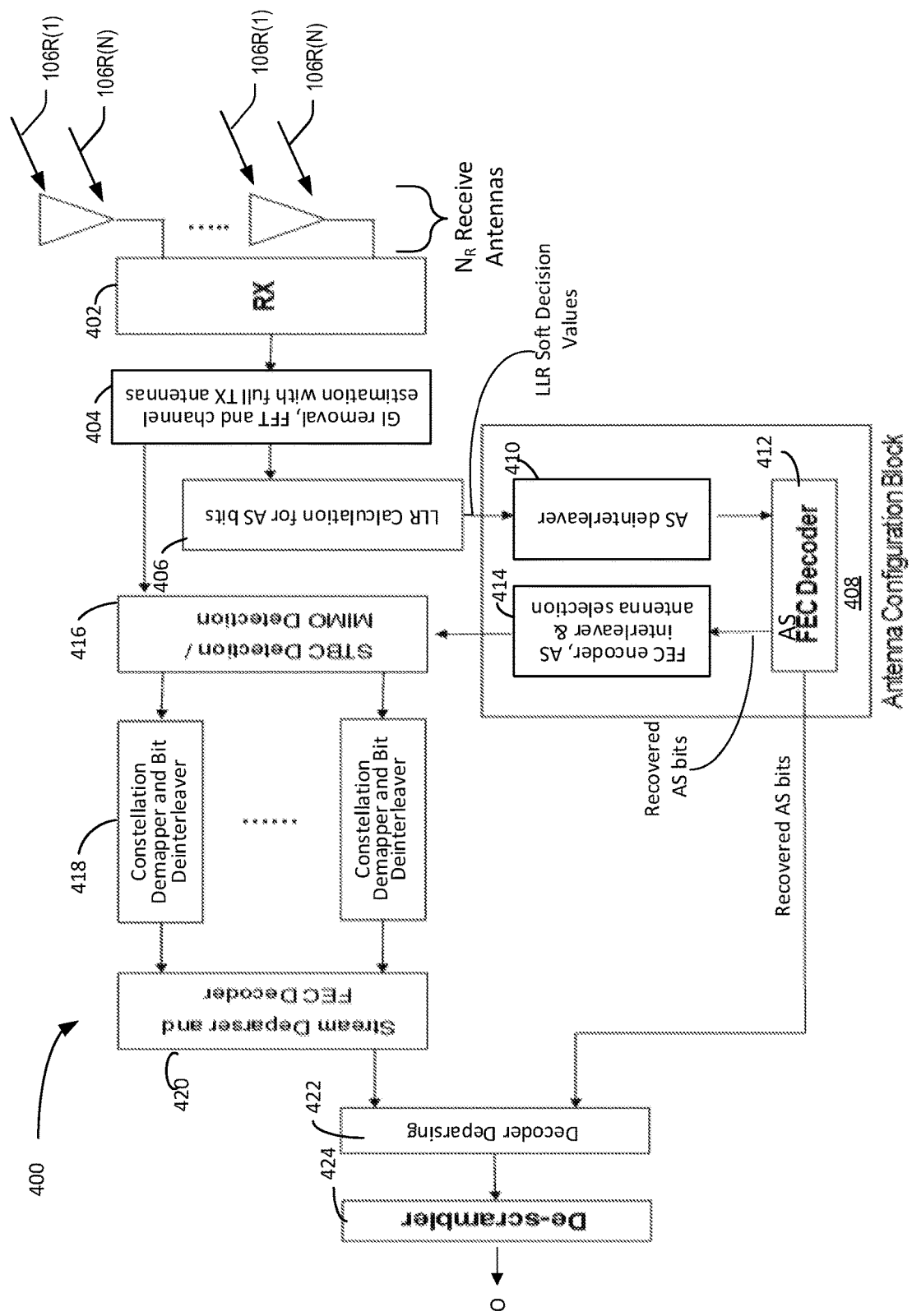
FIG. 4 is a block diagram illustrating a receiver according to the first example embodiment.

Referring to FIG. 4, the transmitted SM streams 106(1) to 106(N) are received at a receiver 400 as received SM streams 106R(1) to 106R(N), respectively. The receiver blocks shown in FIG. 4 represent processing operations that may, for example, be implemented by the processing system 200 of a STA 104. As shown in FIG. 4, receiver 400 includes $N_R$ receive antennas. Each of the $N_R$ receive antennas receives all N of the SM streams 106R(1) to 106R(N). The receiver 400 includes receiver (RX) processing operations (block 402) that filter and downconvert the SM streams 106R(1) to 106R(N) received at each receive antenna to baseband. As shown in block 404, GI removal is applied to the baseband symbols in the received streams, and a fast Fourier transform is applied to convert the symbols to frequency domain. Additionally, the $N_T$ HT-LTF signals included in the received streams are used to perform channel estimation for each of the possible $N_T \times N_R$ RF channels between receiver 400 and transmitter 300. The antennas selected at the transmitter are inherently communicated by the SM streams 106R(1) to 106R(N), and ML LLR calculations are performed to extract the AS information. In particular, as indicated at block 406, LLR calculations are performed to estimate the AS bits inherent in the received streams 106R(1) to 106R(N). For example, in the case where two of 4 possible antennas are used, ML based LLR is performed according to all antenna selection combinations for the first bit 0 or 1 and the second bit 0 or 1. The likelihood for bit 0 minus the likelihood for bit 1 will be the LLR to the corresponding bit like the first AS bit (or the second AS bit) per sub-carrier. The LLRs for the AS bits are obtained by taking a logarithm of a sum over multiple exponentials. The sum of exponentials can be approximated by finding a maximum exponent value of exponentials, which can be given as below [1].

$$L(s^i \mid y, H_{\tilde{s}}) \approx \min_{\tilde{s} \in s_1^i, \tilde{x} \in \aleph} \left\{ \frac{1}{2\sigma^2} \|y - H_{\tilde{s}} \tilde{x}\|^2 \right\} + \min_{\tilde{s} \in s_0^i, \tilde{x} \in \aleph} \left\{ \frac{1}{2\sigma^2} \|y - H_{\tilde{s}} \tilde{x}\|^2 \right\} \qquad \text{Equation 1}$$

where:
  $L(s^i|y, H_{\tilde{s}})$ is the LLR for the i$^{th}$ Antenna bit selection when the received signal is a vector, y, across the RX streams 106R(1) to 106R(N) and $H_{\tilde{s}}$ is the channel matrix for the selected antenna set.
  $\tilde{s}$ is the selected antenna bit selection, and $s_0^i$ is the antenna configuration set when the i$^{th}$ Antenna bit selection is 0. $\tilde{x}$ is the QAM constellation set, and
  $\aleph$ is the entire QAM constellation set, where the QAM constellation set is two elements of the entire QAM constellation set—for example in the case of 2 streams selected from a possible 4, the QAM constellation set is two of the 16 QAM constellation points in the entire QAM constellation set.

The number of LLR outputs per subcarrier is determined by the number of bits used to select the TX antennas. Thus, according to the example in Table 1 where N=2, there will be two LLR outputs per subcarrier from block 406. In the example of FIG. 4, the LLR outputs are soft decision information that is processed by an Antenna Configuration block 408. In this regard, the LLR soft decision outputs for the antenna selection bits are de-interleaved (block 410) to reverse the AS interleaving done at the transmitter AS interleaver 332, and then will pass through an AS FEC decoder 412 to recover the AS bits that were originally input to transmitter AS FEC encoder 330. Accordingly, the output of AS FEC decoder 412 is the recovered version of the AS bits that were originally provided as input (the original AS bits) to the AS stream group 305 of transmitter blocks.

As shown in FIG. 4, the recovered AS bits are then re-encoded and re-interleaved to recreate the processed AS bits and these recreated processed AS bits are used to make a final AS selection decision (block 414). In particular, the operations performed at block 414 on the recovered AS bits are the same as those performed by the AS group 304 of transmitter blocks on the original AS bits, resulting in a recovered version of the AS processed bits and the AS information that was generated at by the AS group 304 of transmitter blocks. The receiver 400 thus has a local copy of the antenna selection information of table 1 to apply.

The resulting antenna selection information is then fed to a MIMO Detection process (block 416) (As noted above, STBC is omitted from the present example and will be discussed in the context of a further example below). MIMO detection is performed on the baseband SM streams to recover N spatial streams. This MIMO detection is done with the knowledge of what transit antennas were used for the OFDM symbols. The N recovered spatial streams can then be processed in parallel using respective constellation demapper and bit deinterleaver operations (blocks 418), and the resulting data streams deparsed and FEC decoded (block 420) to reverse the stream parsing and FEC encoding that was performed at transmitter blocks 312, 310. A decoder deparsing operation (block 422) is then performed to reunite the recovered AS bit stream with the recovered data bit stream by reversing the parsing done at transmitter block 308. Finally, a de-scrambler operation (block 424) is applied to generate an output data stream O, which is the recovered version of input data stream I.

As noted above, MIMO detection (block 416) can be performed with full knowledge of the transmit channels based on the Antenna Selection performed by Antenna Configuration Block 408. This reduces the channel coefficient matrix H for detecting data from SM streams 106R(1) to 106R(N) from $N_T \times N_R$ to $N \times N_R$, where $N < N_T$. Accordingly, by enabling the AS stream to be processed independently of the data streams at the receiver 400, the system of FIGS. 3 and 4 permits the receiver to know what transmit antennas were used prior to decoding the data streams. This, in turn, allows a simpler detection process to be applied to recover the individual spatial streams from SM streams 106R(1) to 106R(N) and subsequently decode the data in the streams. For example, the MIMO detection applied in block 416 can be based on a less resource intensive detection algorithm such as MMSE or ZF rather than a more intensive ML based LLR computation. If MMSE or ZF detection is used, LLR computation can then be performed for each stream individually, using a smaller channel coefficient matrix H.

With respect to LLR calculations performed in respect of the AS bits (block 406), as noted above, the LLR outputs per subcarrier are determined by the number of bits used to select the TX antennas. Although ML based LLR computation is used in the receiver 400 for detecting the AS bits, it is only required for a subset of bits (e.g. the number of AS bits) per subcarrier, rather than for all bits including data and AS bits.

Thus, the use of separate AS bit specific FEC encoder and AS Interleaver operations (blocks 332, 334) in transmitter 300 and corresponding AS bit specific operations at receiver 400 enables an AS bitstream (which includes bits that carry AS information as well as data) to be processed independently of data bitstreams (which include data-only bits), allowing different detection methods to be applied to each stream. Detection performed on the data bitstreams can be done with knowledge of transmitter antenna selection that is derived from the AS bitstream.

In example embodiments, STBC can be applied by transmitter 300, and corresponding STBC detection can be performed at receiver 400. STBC adds an additional layer of processing at the transmitter and receiver because N spatial streams are not directly mapped to N space time streams. The use of STBC can provide a diversity gain by using a greater number of transmit chains and transmit antennas than there are spatial streams.

Figure 5:
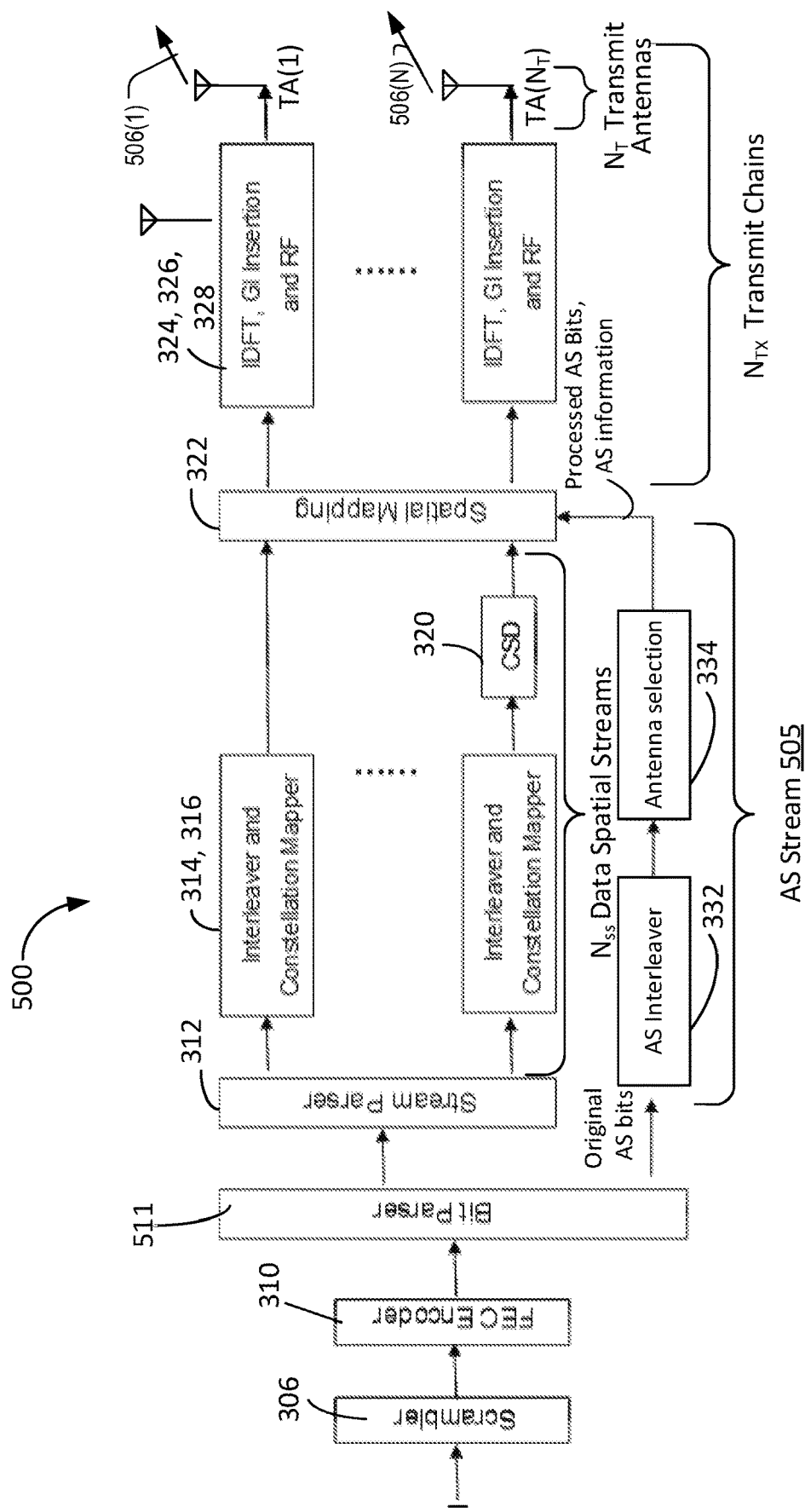
FIG. 5 is a block diagram illustrating a transmitter according to a second example embodiment.

FIG. 5 is a block diagram illustrating a transmitter 500 implemented by the processing system 200 of an AP 102 according to a further example embodiment. Operational blocks of transmitter 500 that have the same function as in transmitter 300 are referenced with the same reference numbers as used in FIG. 3. One difference between transmitter 500 and transmitter 300 is that the data bits from input stream I that are used for AS bits are not divided out from the input data bitstream I until after FEC encoding has occurred. In this regard, as shown in FIG. 5, bit parser operation (block 511) occurs after the input data bitstream I has been scrambled (block 306) and FEC encoded (block 310). At bit parser operation (block 511), the data bits that are used for antenna selection (denoted in FIG. 5 as the original AS bits) are divided into an AS stream 505 from the rest of the data bitstream. The data bitstream is parsed (block 312) into N parallel data spatial streams that are subjected to interleaving, constellation mapping and CSD (blocks 314, 316, 320) and provided to spatial mapping process (block 322).

The original AS bits in the AS stream 505 are processed by AS interleaver and antenna selection operations (blocks 332 and 334) in the same way as described above in respect of transmitter 300, to provide processed AS bits and AS information for the spatial mapping process (block 322). Spatial mapping process (block 322) maps the respective data spatial streams to the respective transmit chains as specified by the AS information, and also encodes every subcarrier with the processed AS bits, resulting in transmitted SM streams 506(1) to 506(N).

Figure 6:
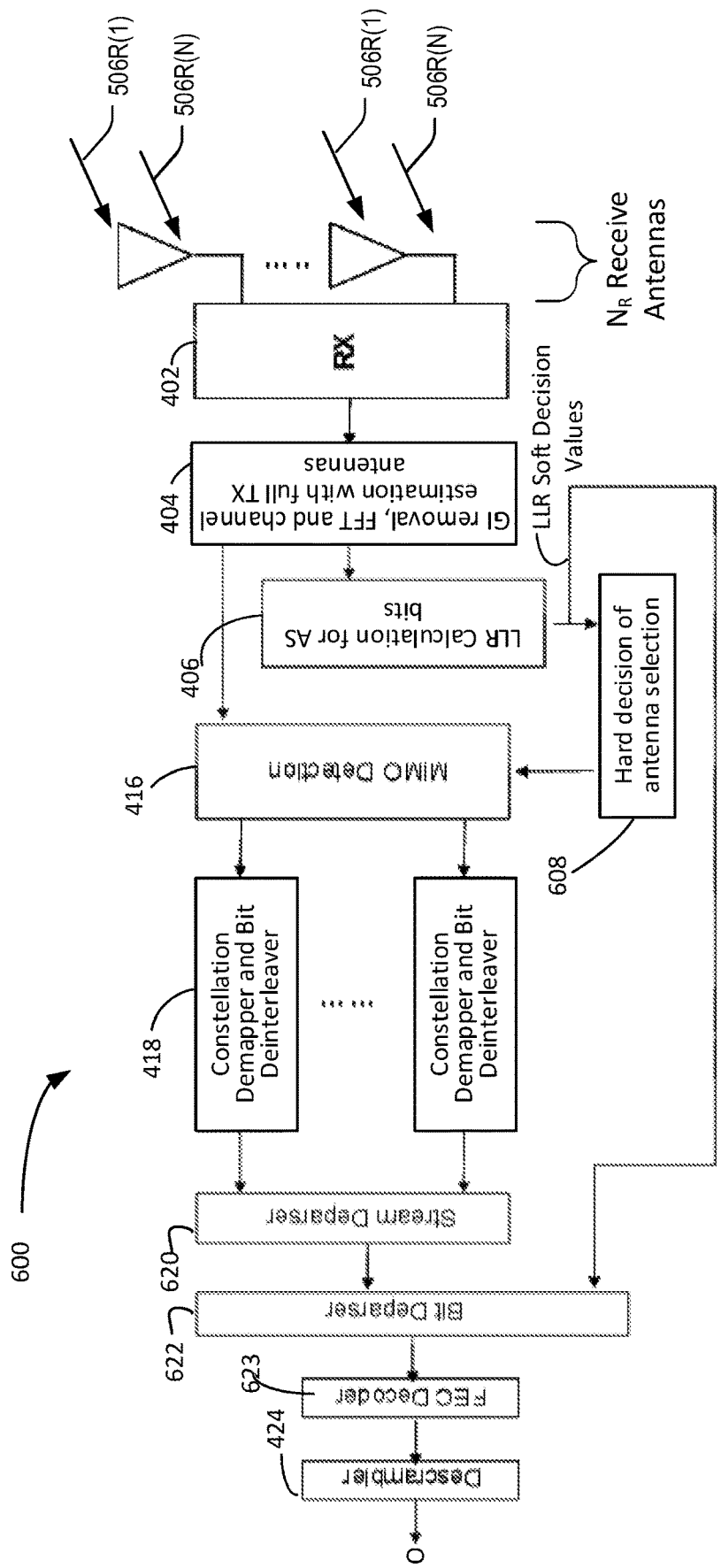
FIG. 6 is a block diagram illustrating a receiver according to the second example embodiment.

As shown in FIG. 6, a receiver 600 having a different receiver configuration than receiver 400 is required for receiving SM streams 506R(1) to 506R(N) from transmitter 500. This is because the joint FEC encoding of the AS bits and the data-only bits before parsing in transmitter 500 makes it difficult for a receiver to run separate decoding and re-encoding process for only the AS bits as is done in receiver 400. In FIG. 6, operational blocks of receiver 600 that have the same function as in receiver 400 are referenced with the same reference numbers as used in FIG. 4.

Receiver 600 differs from receiver 400 in that the Antenna configuration block 408 of receiver 400 (which includes AS de-interleaver and FEC decoder processes (blocks 410, 412) and the re-encoding, re-interleaving and antenna selection processes (block 414) are all replaced in receiver 600 with a simple hard decision antenna selection process (block 608). Accordingly, in receiver 600, a hard decision for the AS is made right after the LLR calculation (block 406, using equation (1)) for the AS bits. As a result of the hard decision, the MIMO detection process (block 416) is made aware of the selected transmit antennas used at the transmitter 500 and MIMO detection does not need be limited to an ML based LLR computation, but can alternatively use less computationally intensive detection algorithms such as MMSE and ZF. If MMSE or ZF detection is used, LLR computation is processed per each spatial data stream individually.

In some examples, MIMO detection (block 416) can be done based on an ML based LLR calculation. For example, the ML based LLR calculation can be performed for all possible combinations of antenna configurations—in the case where the transmit antennas are determined prior to MIMO detection, the number of antenna combinations is lower than when the transmit antennas have not been determined. An example of a MIMO detection ML based LLR calculation for the data streams is given below as in Equation (2).

$$L(x^q \mid y, H_{\tilde{s}}) \approx -\min_{\tilde{s} \in S, \tilde{x} \in x_1^q}\left\{\frac{1}{2\sigma^2}\|y - H_{\tilde{s}}\tilde{x}\|^2\right\} + \min_{\tilde{s} \in S, \tilde{x} \in x_0^q}\left\{\frac{1}{2\sigma^2}\|y - H_{\tilde{s}}\tilde{x}\|^2\right\}$$

Equation 2

$L(x^q|y, H_{\tilde{s}})$: LLR for the $q^{th}$ transmitted data bit when the received signal is a vector y across the RX streams and $H_{\tilde{s}}$ is the channel matrix for the selected antenna set
$\tilde{s}$: Selected Antennas bit selection
S: Entire antenna configuration set
$\tilde{x}$: CAM constellation set
$x_1^q$: QAM constellation set for the $q^{th}$ transmitted data bit, 1

As noted above, in example embodiments, AS bits can be applied even to pilot carriers which are typically not used to transmit information. When pilot carriers are transmitted through the Antennas selected by the AS bits, the LLR calculation for the Antenna Selection bits can be done through the Euclidean distance computation between the received signal and binary phase shift keying (BPSK) or quadrature BPSK (QBPSK) constellation, regardless of the MCS for the information bits of the data field.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method performed at a transmitter, comprising:
applying forward error correction (FEC) encoding to encode a first portion of an incoming data bitstream into a first encoded bitstream;
applying FEC encoding to encode, independently of the first portion, a second portion of the incoming data bitstream into an antenna selection (AS) bitstream;
encoding each of a plurality of spatial streams into respective symbols, each spatial stream being a different respective portion of the first encoded bitstream; and
transmitting each respective one of the symbols over a respective transmit antenna set, each respective transmit antenna set including one or more antennas transmitting the respective one symbol, the respective transmit antenna set for transmitting each respective one symbol being determined by AS bits from the AS bitstream.

2. The method of claim 1, wherein encoding each of the plurality of spatial streams into respective symbols comprises:
mapping bits in each of the spatial streams to constellation points representing the respective symbols.

3. The method of claim 1, wherein the symbols are orthogonal frequency division multiplexing (OFDM) symbols.

4. The method of claim 3, wherein the AS bits are inherently detectable by a receiver, based on a sub-carrier for each of the OFDM symbols.

5. The method of claim 1, wherein the method is for generating and transmitting a data Physical Layer Convergence Procedure (PLCP) Protocol Data Unit (PPDU), wherein the incoming data bitstream includes data for a data field of the PPDU, the method further comprising:

including, in a preamble of the PPDU, a plurality of long training fields (LTFs), wherein the number of LTFs in the preamble corresponds to a total number $N_T$ of transmit antennas;

wherein the total number $N_T$ of transmit antennas is greater than a number N of transmit streams used for transmitting the data PPDU.

6. The method of claim 1, wherein each transmitted symbol includes a respective pilot subcarrier, and the method further comprises mapping the pilot subcarrier of each respective symbol to a respective transmit antenna set, in accordance with the AS bits.

7. A processing system comprising memory and a processing device coupled to the memory, the processing device being configured to:

apply forward error correction (FEC) encoding to encode a first portion of an incoming data bitstream into a first encoded bitstream;

apply FEC encoding to encode, independently of the first portion, a second portion of the incoming data bitstream into an antenna selection (AS) bitstream;

encode each of a plurality of spatial streams into respective symbols, each spatial stream being a different respective portion of the first encoded bitstream; and transmit each respective one of the symbols over a respective transmit antenna set, each respective transmit antenna set including one or more antennas transmitting the respective one symbol, the respective transmit antenna set for transmitting each respective one symbol being determined by AS bits from the AS bitstream.

8. The processing system of claim 7, wherein the processing device is configured to encode each of the plurality of spatial streams into respective symbols by:

mapping bits in each of the spatial streams to constellation points representing the respective symbols.

9. The processing system of claim 7, wherein the symbols are orthogonal frequency division multiplexing (OFDM) symbols.

10. The processing system of claim 9, wherein the AS bits are inherently detectable by a receiver, based on a subcarrier for each of the OFDM symbols.

11. The processing system of claim 7, wherein the processing device is configured to generate a data Physical Layer Convergence Procedure (PLCP) Protocol Data Unit (PPDU) using the encoding, the incoming data bitstream including data for a data field of the PPDU, and to transmit the PPDU over the respective transmit antenna sets using the transmitting, the processing device being further configured to:

include, in a preamble of the PPDU, a plurality of long training fields (LTFs), wherein the number of LTFs in the preamble corresponds to a total number $N_T$ of transmit antennas;

wherein the total number $N_T$ of transmit antennas is greater than a number N of transmit streams used for transmitting the data PPDU.

12. The processing system of claim 7, wherein each transmitted symbol includes a respective pilot subcarrier, and the processing device is configured to map the pilot subcarrier of each respective symbol to a respective transmit antenna set, in accordance with the AS bits.

* * * * *